(12) United States Patent
Fujii (10) Patent No.: US 6,702,326 B1
(45) Date of Patent: Mar. 9, 2004

(54) PASSENGER RESTRAINING PROTECTIVE SYSTEM

(75) Inventor: Hiroaki Fujii, Tokyo (JP)

(73) Assignee: Takata Corporation, Tokyo (JP)

( * ) Notice: Subject to any disclaimer, the term of this patent is extended or adjusted under 35 U.S.C. 154(b) by 87 days.

(21) Appl. No.: 09/722,267

(22) Filed: Nov. 28, 2000

(30) Foreign Application Priority Data

Nov. 29, 1999 (JP) .......................................... 11-337769

(51) Int. Cl.$^7$ ............................................. B60R 22/46
(52) U.S. Cl. ......................................... 280/806; 180/268
(58) Field of Search ............................... 280/806, 748; 180/268, 271; 297/480; 242/382, 413, 374, 390.8

(56) References Cited

U.S. PATENT DOCUMENTS

| | | | | |
|---|---|---|---|---|
| 4,199,172 A | * | 4/1980 | Fukunaga et al. | 280/807 |
| 4,467,982 A | * | 8/1984 | Tajima et al. | 242/385 |
| 4,620,677 A | * | 11/1986 | Nagao et al. | 242/385 |
| 4,741,556 A | * | 5/1988 | Nagashima | 242/374 |
| 4,807,715 A | * | 2/1989 | Nagashima et al. | 180/268 |
| 4,896,844 A | * | 1/1990 | Gavagan et al. | 280/807 |
| 5,261,696 A | * | 11/1993 | Hamaue | 280/802 |
| 5,552,986 A | | 9/1996 | Omura | 364/424.5 |
| 5,765,774 A | * | 6/1998 | Maekawa et al. | 180/268 |
| 6,142,524 A | * | 11/2000 | Brown et al. | 280/806 |
| 6,179,330 B1 | * | 1/2001 | Wier | 280/806 |
| 6,213,512 B1 | * | 4/2001 | Swann et al. | 280/806 |
| 6,427,935 B1 | * | 8/2002 | Fujii et al. | 280/806 |
| 6,499,554 B1 | * | 12/2002 | Yano et al. | 180/268 |

FOREIGN PATENT DOCUMENTS

| | | |
|---|---|---|
| DE | 44 11 184 | 10/1994 |
| DE | 4332205 | 3/1995 |
| DE | 19731689 | 2/1999 |
| EP | 0 893 313 | 7/1998 |
| JP | 05-193443 | 8/1993 |
| JP | 06-286581 | 11/1994 |

* cited by examiner

*Primary Examiner*—Paul N. Dickson
*Assistant Examiner*—Joselynn Y. Sliteris
(74) *Attorney, Agent, or Firm*—Foley & Lardner (57) ABSTRACT

The present invention has an object to permit operation of the second pretensioner operating upon determination of a collision, irrespective of operation of the first pretensioner operating upon determination of the possibility of collision. When a vehicle body deceleration is determined not to exceed a set deceleration, possibility of collision with an obstacle is determined on the basis of a relative distance from the obstacle, a relative speed, and a vehicle speed of the subject vehicle. When the possibility of a collision is determined, a motor associated with a retractor is rotated and the webbing is retracted with a large torque until the webbing has the second set belt tension. When the vehicle deceleration is determined to be over a set deceleration, a buckle pretensioner is operated. The buckle is very strongly pulled, and the webbing is set at a third belt tension. The passenger is thus restrained by a large restraining force. At this point, the buckle pretensioner is preferentially operated irrespective of operation of the motor.

11 Claims, 12 Drawing Sheets

PASSENGER RESTRAINING PROTECTIVE SYSTEM

BACKGROUND OF THE INVENTION

This application claims priority to Japanese application no. JP H11-337769, filed Nov. 29, 1999, the disclosure of which is hereby incorporated by reference in its entirety.

1. Field of the Invention

The present invention is a passenger restraining protective system for restraining a passenger with a seat belt retracting apparatus that retracts and draws out seat belt webbing. More particularly, the invention is a seat belt retracting apparatus for controlling the belt tension within a predetermined belt tension when the possibility of collision is predicted or when a collision is determined.

2. Description of the Related Art

Passenger restraining protective systems having a seat belt retracting apparatus for retracting a webbing generally protect vehicle passengers in an emergency by preventing the passengers from moving away from the seat and restraining them. Such an emergency is a collision where the vehicle undergoes a large deceleration.

Japanese Unexamined Patent Publication No. 6-286581 proposes such a vehicle shoulder belt apparatus. Upon prediction of the possibility of a collision with an obstacle, a first pretensioner comprising a retractable buckle is operated to restrain the passenger under a prescribed belt tension. To ensure sufficient protection, upon detection of a collision, a second pretensioner based on a gunpowder or a spring is operated to ensure restraint and protection of the passenger under a higher tension than achieved only upon operation of the first pretensioner. The first pretensioner operates when a collision predicting sensor predicts the collision, and then, when a 3-sensor or the like detects a large vehicle deceleration, and hence occurrence of the collision, the second pretensioner operates.

More specifically, determining whether to operate the second pretensioner is carried out always after determining whether the first pretensioner should be operated. In other words, operation of the second pretensioner always depends upon the operation of the first pretensioner. As a result, for example, when a car suddenly rushes out from the side in front of a car mounting a frontward collision predicting sensor, the collision predicting sensor cannot detect the rushing car in time, and it may be difficult for the sensor to output an operating signal of the second pretensioner before a collision or upon a collision, thus making it impossible to certainly cause the second pretensioner to operate when the collision cannot be avoided.

The first pretensioner brings over the buckle by retracting a wire with a motor. When the first pretensioner with the motor is provided on the buckle side, a problem occurs. Installation of the motor-based first pretensioner is difficult because the space available on the buckle side is very limited, while the installation of the motor may require a relatively large space.

The second pretensioner using gunpowder or a spring is provided on the retractor side. For installation of the second pretensioner on the retractor side, it is necessary to operate a clamp mechanism of the second pretensioner prior to operating the first pretensioner, and in addition, to lock drawout of the webbing retracted onto the retractor. This leads to more complicated control of various operations of the first and second pretensioners, to the necessity of providing a locking mechanism which locks drawout of the webbing upon operation of the first pretensioner, and to a troublesome operational control of the locking mechanism.

In the case of a slight collision, when the car is driven again after operation of the second pretensioner, it is difficult to control operation of the retractor and the slack of the webbing cannot be eliminated, making it difficult to restrain and hold the passenger.

SUMMARY OF THE INVENTION

The present invention was developed in view of the circumstances as described above and has as an object to provide a passenger restraining protective system which permits operating a second pretensioner upon determining the occurrence of a collision separately from operating the first pretensioner upon determination the possibility of a collision.

Another object of the invention is to provide a passenger restraining protective system which not only better facilitates installation of the first and second pretensioners, but also permits easier operational control thereof. another object of the invention is to provide a passenger restraining protective system which eliminates the necessity to provide a locking mechanism locking drawout of the webbing upon operation of the first pretensioner on the seat belt retracting apparatus.

To solve the aforementioned problems, the invention provides a passenger restraining protective system having a seat belt retracting apparatus retracting a webbing restraining a passenger, comprising a first pretensioner which operates when possibility of collision is determined to set the first belt tension higher than that of normal driving; a second pretensioner which operates when a collision is determined to have occurred to set the second belt tension higher than said first set tension; and a controller which, when a collision is determined to have occurred, causes the second pretensioner preferentially to operate, irrespective of the operation of the first pretensioner. The first pretensioner is provided in the seat belt retracting apparatus. A buckle pretensioner can be used as the second pretensioner.

Even after the second pretensioner stops operating, when the first pretensioner operates, the first pretensioner continues operating until the possibility of collision is resolved.

In the passenger restraining protective system of the invention, when a collision is determined, the second pretensioner is preferentially operated by the controller, irrespective of the operation of the first pretensioner, to set a second set tension higher than the first set tension that would result from the first pretensioner. As a result, even in case of a collision which cannot be detected by a conventional sensor for predicting a collision as described above, the passenger is restrained and protected by a strong restraining force. Particularly, when the first pretensioner is provided in the seat belt retracting apparatus, the necessity to control the operation of the second pretensioner during operation of the first pretensioner is eliminated. Further, it is not required any longer to lock the seat belt taken up on the retractor from withdrawal since such withdrawal is prevented.

In the present invention, the first pretensioner requiring a relatively large space for installation can be provided in the seat belt apparatus and the second pretensioner requiring a relatively small installation space can be provided on the buckle side. This makes it easier to install the pretensioner on the buckle side where only a small space is available.

Further, operation of the first pretensioner can be continued even after operation of the second pretensioner, until and unless the possibility of a collision is resolved. When a is driven after a slight collision, the slack of the webbing can therefore be removed without fail, thus permitting restraint of the passenger.

DETAILED DESCRIPTION OF THE EMBODIMENTS

Embodiments of the present invention will now be described with reference to the drawings.

Figure 1:
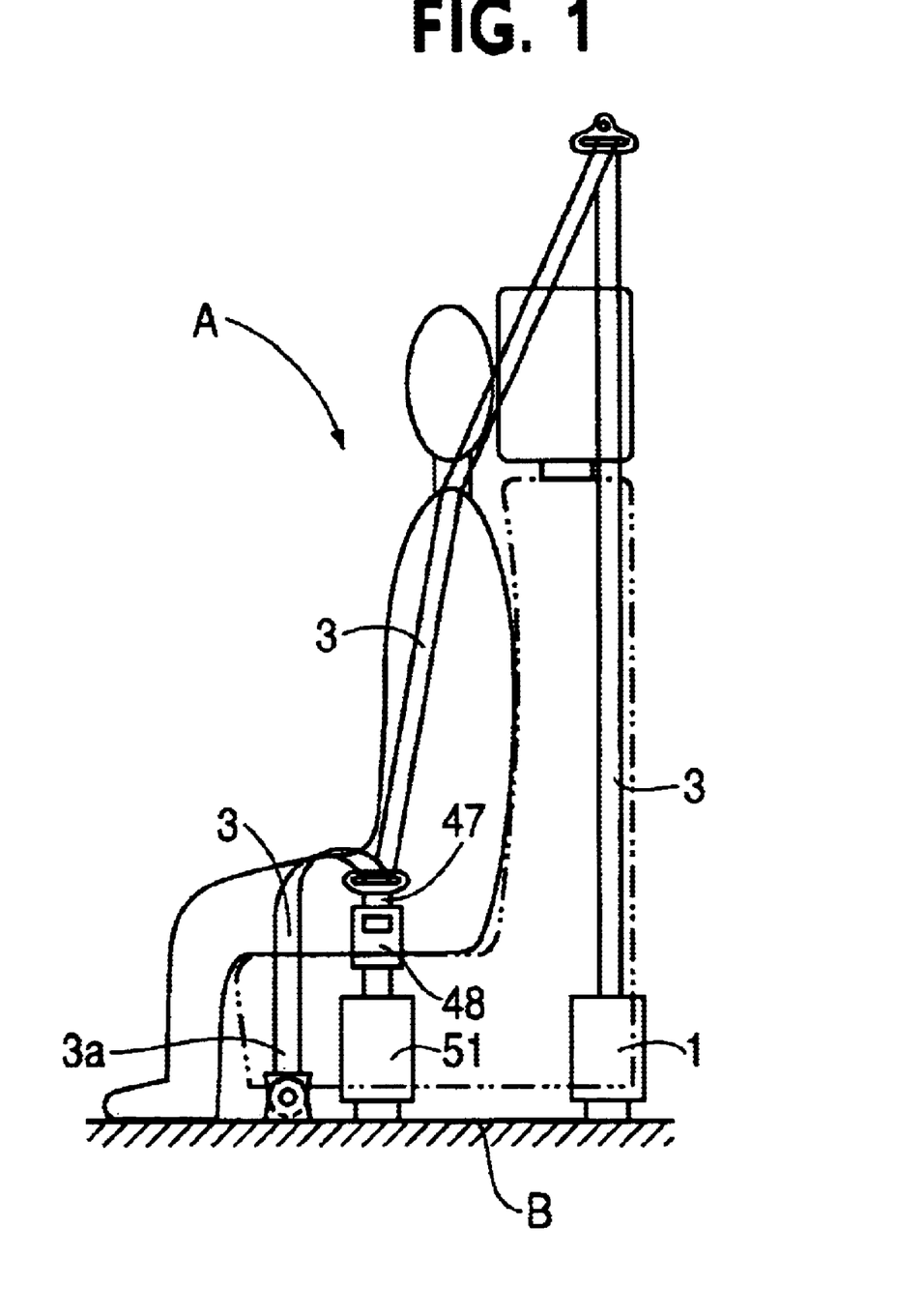
FIG. 1 is a schematic view of an example of an embodiment of the passenger restraining protective system of the present invention.

As shown in FIG. 1, the passenger restraining protective system A of this embodiment comprises a seat belt retracting apparatus 1 secured to a car body B and retracts a webbing 3 having a leading end 3a similarly secured to the car body B only by means of the driving force of a motor; a tongue 47 is slidably supported by the webbing 3; and a buckle 48 which is secured to the car body B via a buckle pretensioner (the second pretensioner in the present invention) 51, and permits insertion and engagement of the tongue 47. The same pretensioner as the second pretensioner in the above-mentioned Unexamined Patent Publication may be used as the buckle pretensioner, or a pretensioner disclosed, for example, in Japanese Unexamined Patent Publication No. 5-193443 may also be applicable, the disclosures of which are hereby incorporated by reference. That is, any pretensioner may be selected so far as it acts rapidly upon determination of a collision and can restrain the passenger by a strong restraining force by pulling over the buckle 48.

Figure 2:
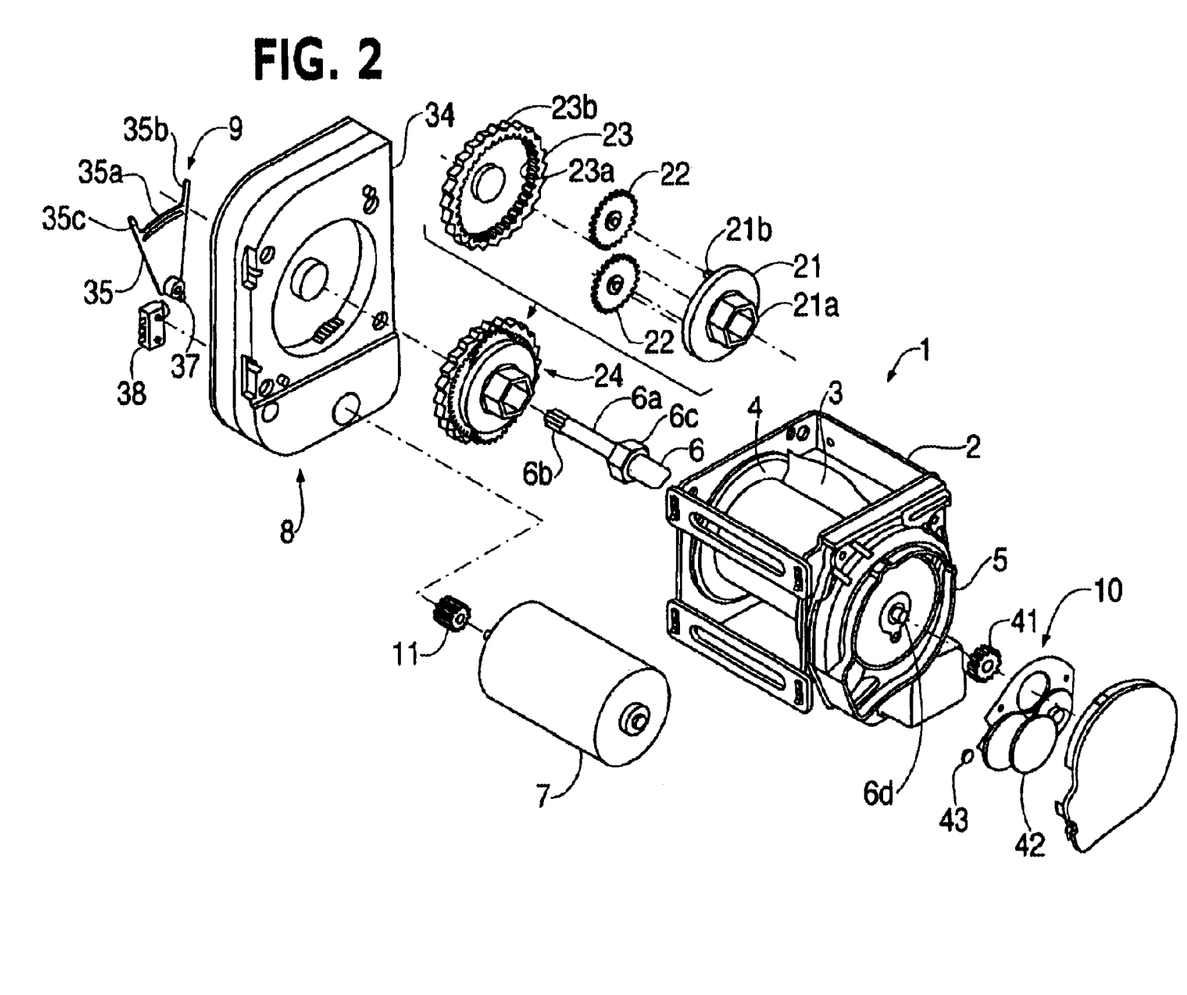
FIG. 2 is an exploded perspective view illustrating the seat belt retracting apparatus used in the example shown in FIG. 1.

As shown in FIG. 2, the seat belt retracting apparatus 1 is the same as that disclosed in a patent application previously filed by the present applicant (Japanese Unexamined Patent Publication No. H11-010184, the disclosure of which is hereby incorporated by reference) and comprises a generally horseshoe-shaped frame 2; a reel 4 for retracting a webbing rotatably supported by the frame 2; a locking mechanism 5 locking the rotation in at least the webbing draw out direction of the reel 4 as required; a reel rotation shaft 6 provided rotatable integrally with the reel 4; a motor 7 speed-variably controllable such as a DC motor or an ultrasonic motor, which is a driving source generating a driving force for rotating the reel 4 in the webbing retracting direction; a decelerating mechanism 8 decelerating the driving force of the motor 7 and transmitting the decelerated speed to the reel 4 via the reel rotation shaft 6; a webbing draw out detecting mechanism 9 for detecting drawing of the webbing 3; and a reel rotation detecting mechanism 10 for detecting the amount of rotation of the reel 4.

In the aforementioned configuration of the seat belt retracting apparatus 1 in this embodiment, the frame 2, the reel 4 and the locking mechanism 5 are the same as those in the conventional seat belt retracting apparatus in which a force is imparted to the reel in the webbing retracting direction by conventionally known general spring means. Description of a particular and set structure and operation thereof is therefore omitted here (there is available a brief description in the above-mentioned patent application).

Figure 3:
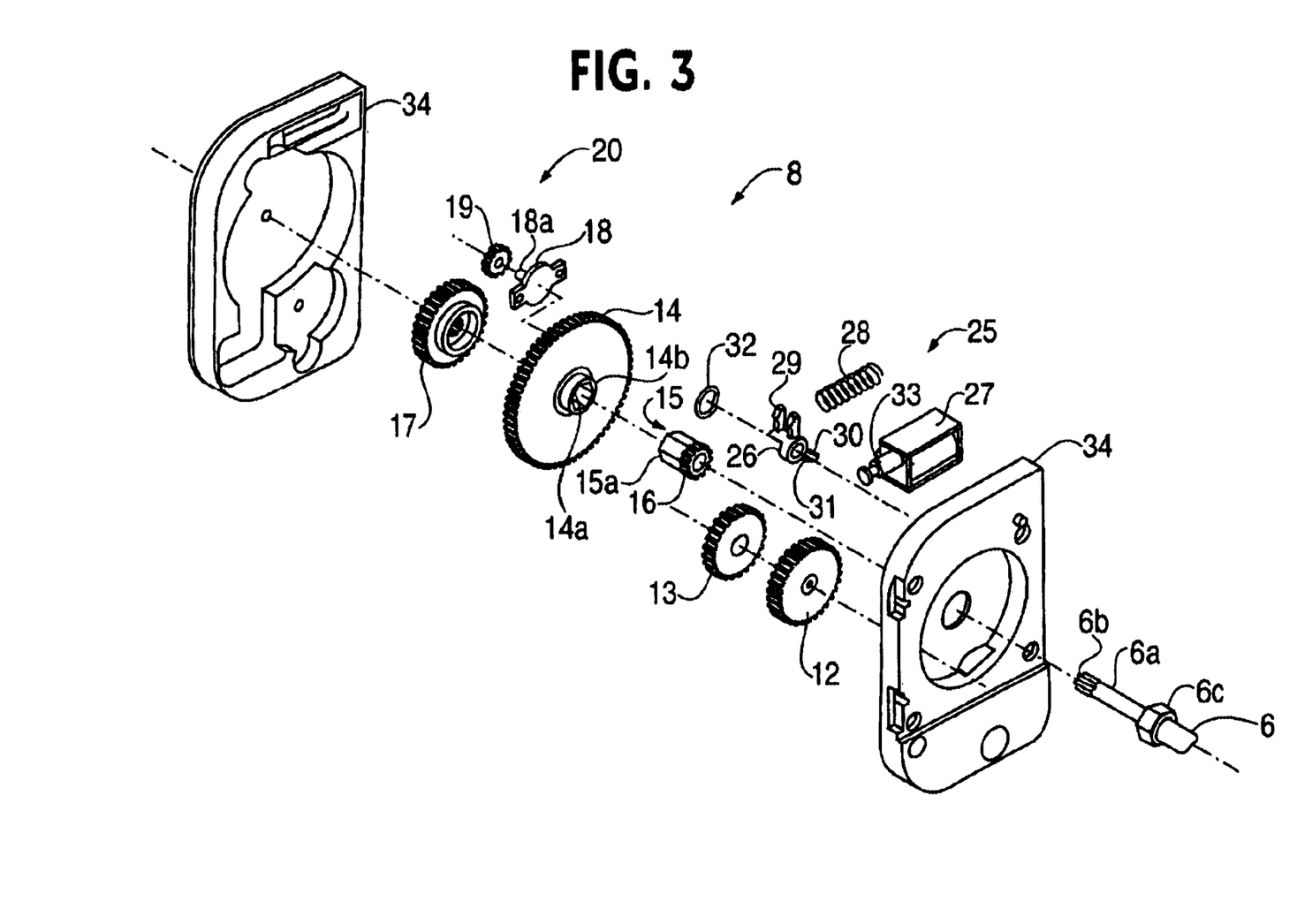
FIG. 3 is an exploded perspective view illustrating a deceleration mechanism in the seat belt retracting apparatus shown in FIG. 2.
Figure 4:
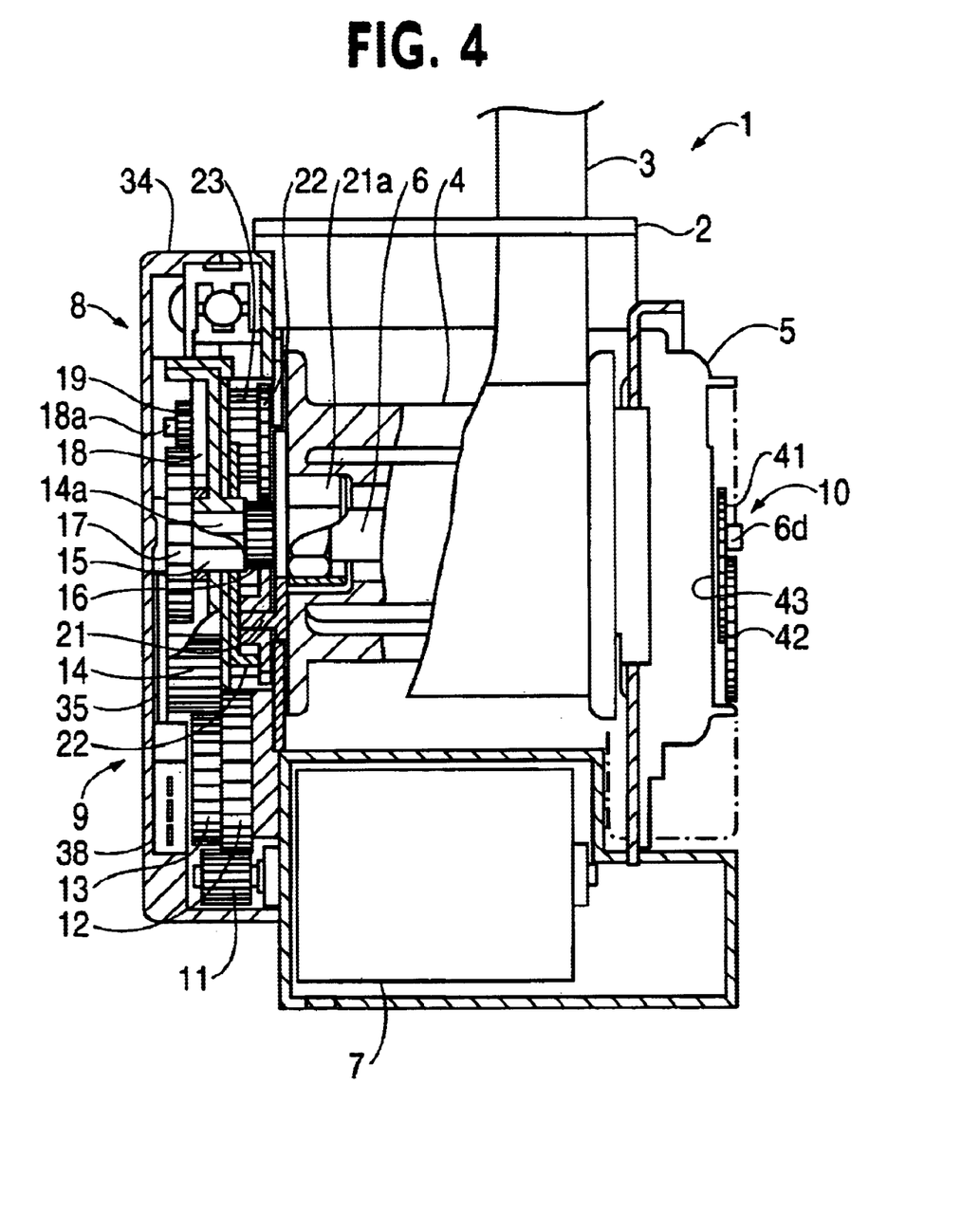
FIG. 4 is a plan view of the deceleration mechanism shown in FIG. 3.
Figure 5:
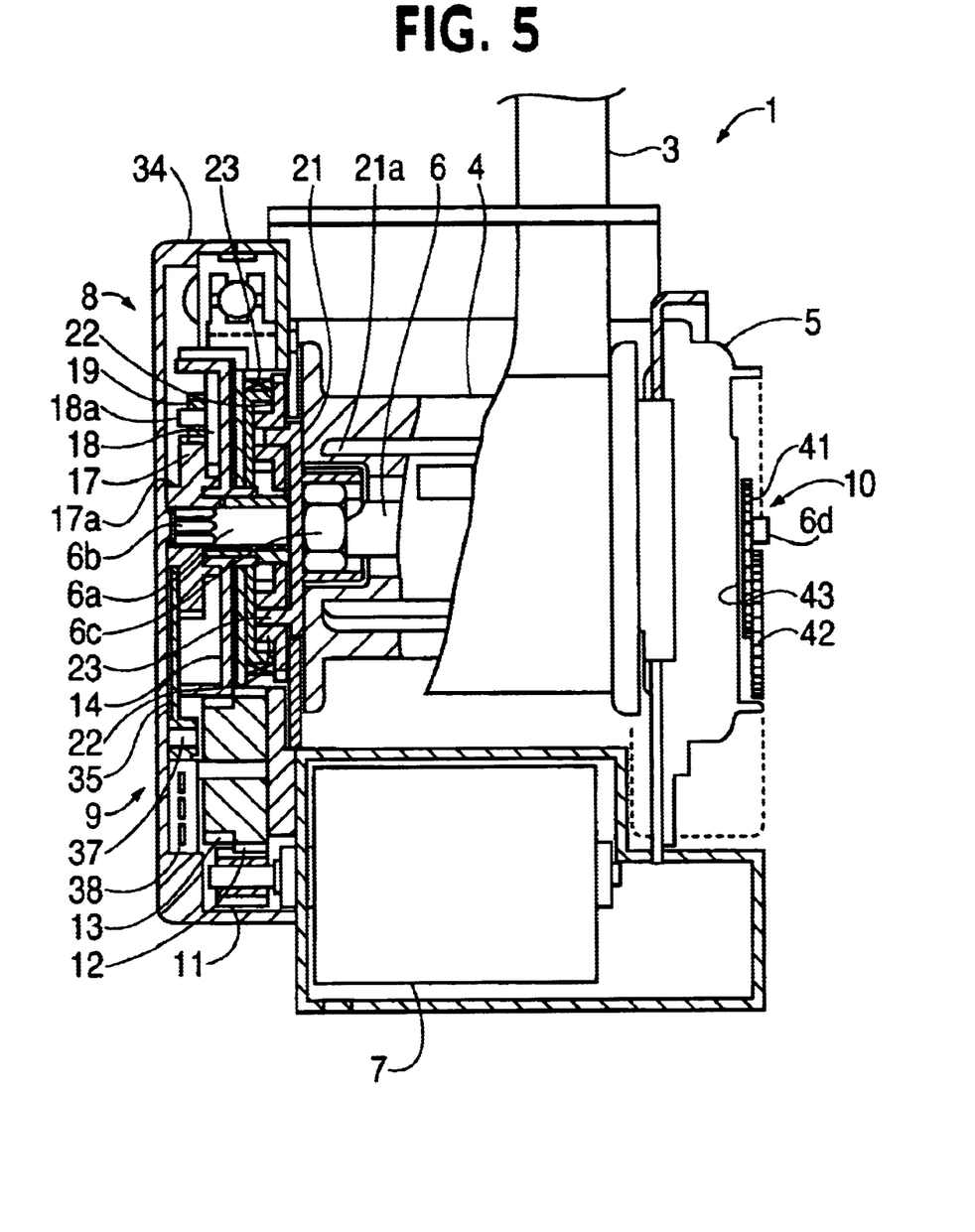
FIG. 5 is a longitudinal sectional view of the deceleration mechanism shown in FIG. 4 cut along the lines passing through the centers of the gears.

As shown in FIGS. 3 to 5, the decelerating mechanism 8 has a large-diameter first gear 12 having a diameter larger than that of a motor gear 11 through which the driving force of the motor 7 is transmitted. A second gear 13 having a diameter smaller than that of the first gear 12 is provided concentrically and rotatably integrally in this first gear 12. Furthermore, a third gear 14 having a diameter larger than that of the first gear 12 is provided so as to always engage with the second gear 13. A boss 14b having a throughhole 14a of a regular hexagonal cross-section is formed at the center portion of the third gear 14.

A bush 15 is relatively rotatably supported by a projecting shaft 6a of the reel rotation shaft 6. The bush 15 has a rotary coupling section 15a having a regular hexagonal cross-section to be rotatably connected through engagement with a throughhole 14a of the third gear 14, and a sun gear 16 provided concentrically at an end. A fourth gear 17 concentrically spline-engages with a spline groove 6b formed at an end of the projecting shaft 6a of the reel rotation shaft 6 so that the driving force of the decelerated motor 7 is transmitted to the reel rotation shaft 6.

A rotary dumper 18 is secured to a side of the third gear 14. The rotary dumper 18 has a rotor shaft 18a. A prescribed set resistance torque set in response to the rotation speed is imparted to the rotor shaft 18a by a viscous resistance of oil sealed therein. A fifth gear 19 is integrally rotatably attached to the rotor shaft 18a, and this fifth gear 19 always engages with the fourth gear 17. A sliding mechanism 20 is composed of the rotary dumper 18 and the fifth gear 19.

Figure 6A:
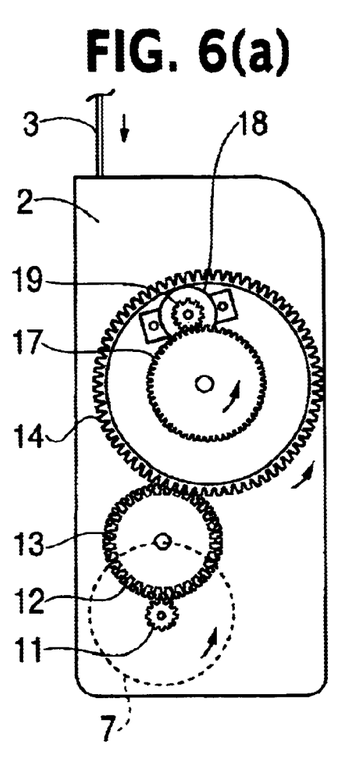
FIGS. 6(a) and 6(b) are descriptive views of operation of a sliding mechanism in the seat belt retracting apparatus shown in FIG. 2 upon retracting the webbing in the non-operating state and the operating state, respectively.
Figure 6B:
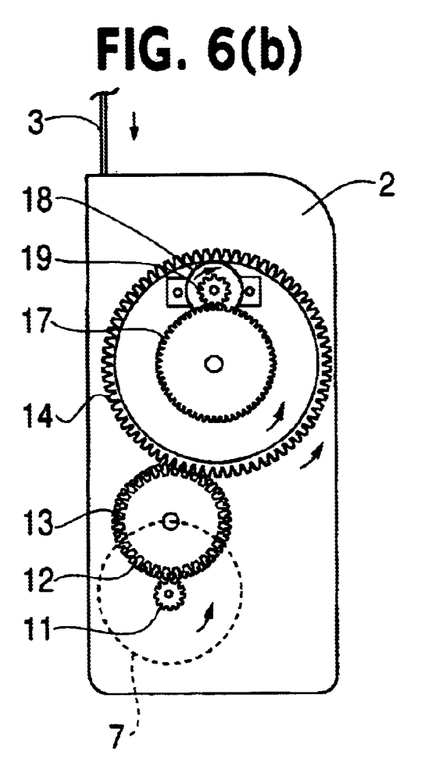

Operation of the sliding mechanism 20 will now be described. When retracting the webbing 3 by low-speed rotation of the motor 7, the third gear 14 as well rotates at a low speed. The rotation torque of the third gear 14 therefore becomes less than the set resistance torque of the rotor shaft 18a. As a result, as shown in FIG. 6(a), the fourth gear 17 does not rotate relatively to the third gear 14, but rotates integrally with the third gear 14. That is, the sliding mechanism 20 does not operate along with low-speed rotation of the motor 7. When rolling up the webbing 3 by high-speed rotation of the motor 7, the third gear 14 as well rotates at a high speed. The rotation torque of the third gear 14 therefore exceeds the set resistance torque of the rotor shaft 1 8a. As a result, as shown in FIG. 6(b), the fourth gear 17 rotates under brake relative to the third gear 14 while receiving the set resistance torque imparted to the rotor shaft 18a via a fifth gear 19. More specifically, in high-speed rotation of the motor 7, the sliding mechanism 20 operates, causing sliding between the third gear 14 and the fourth gear 17, so that transmission of the rotation torque from the third gear 14 to the fourth gear 17 is cut off.

Figure 7:
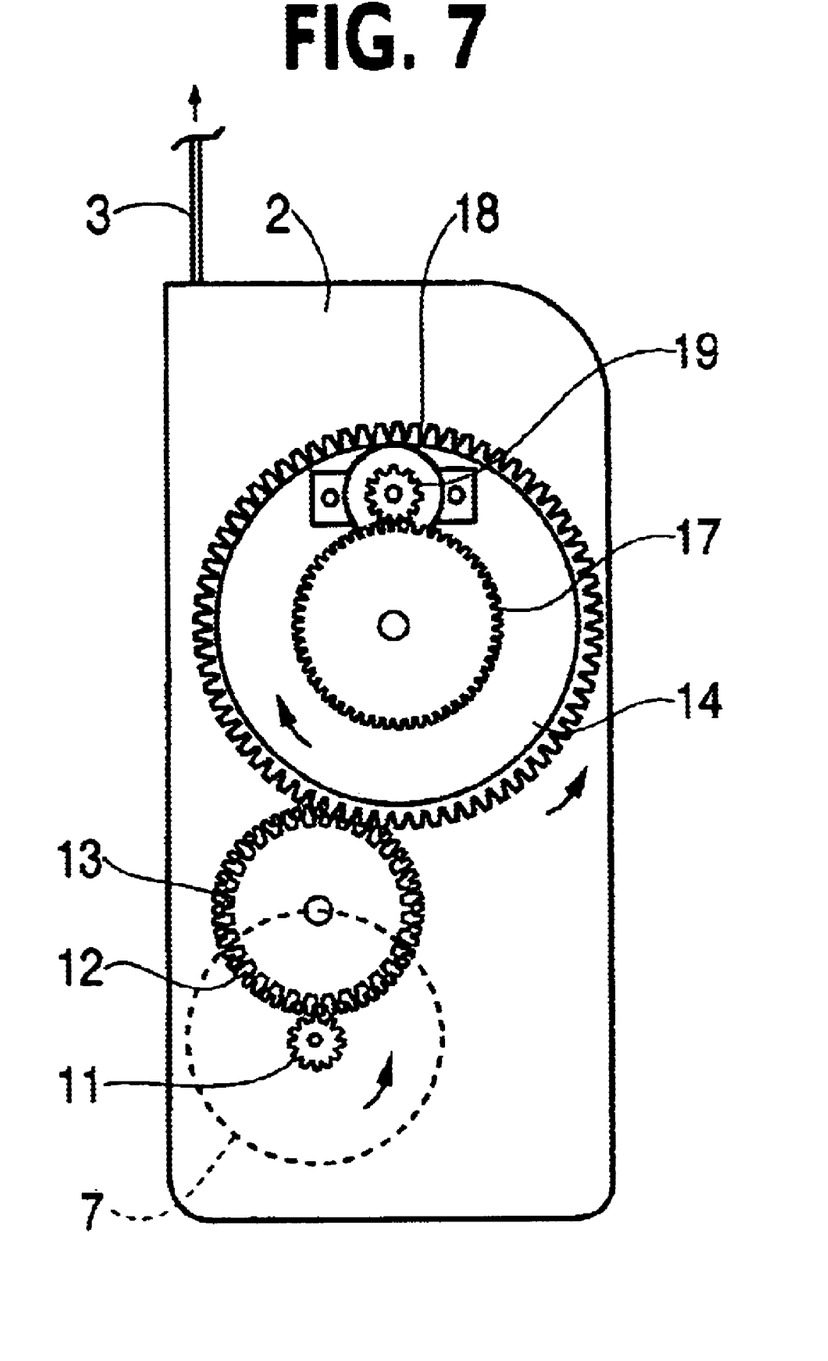
FIG. 7 is a descriptive view of the operation of the sliding mechanism in the seat belt retracting apparatus in the example shown in FIG. 2 when drawing out the webbing.

As shown in FIG. 7, when the passenger presses down the webbing 3 trying to prevent retraction thereof or draw out the webbing 3 in contrast in the middle of retraction of the webbing 3 by the reel 4 through low-speed rotation of the motor 7, the fourth gear 17 stops rotating or rotates in the drawing direction of the webbing 3. This causes the third gear 14 also to stop rotating or to rotate in the draw out direction of the webbing 3. A load in the reverse direction is thus imposed on the motor 7 rotation-driving in the retracting direction of the webbing. At the very moment when this load is imposed on the motor 7, the rotation torque of the fourth gear 17 exceeds the set resistance torque of the rotor shaft 18a of the rotary dumper 18. The fourth gear 17 therefore rotates in a direction counter to the rotating direction of the motor 7, and there occurs sliding relative to the fifth gear 19 connected to the rotor shaft 18a. As a result, the motor 7 stops rotating upon detection of drawing of the webbing 3 by the webbing draw out detecting mechanism 9 as described later, and along with this, the passenger can now easily draw out the webbing 3.

An annular and disk-shaped carrier 21 is provided concentrically with the sun gear 16 provided on the bush 15 and relatively rotatably with the sun gear 16. A power transfer section 6c having a hexagonal cross-section of the reel rotation shaft 6 is inserted into the center portion of the carrier 21, rotationally coupled with the reel rotation shaft 6 in the retracting and draw out directions of the webbing 3. There is also provided a cylindrical socket section 21a having a hexagonal cross-section, connected to the reel 4 externally engaging therewith, rotationally in the retracting and draw out directions of the webbing 3. A pair of support shafts 21b provided in projection on a side of the carrier 21 rotatably support two planetary pinion gears 22 and 22, one having a larger diameter and the other a smaller diameter, respectively. The larger-diameter sides of these planetary pinion gears 22 and 22 always engage with the sun gear 16. Furthermore, a ring gear 23 is provided concentrically with the sun gear 16, and relatively rotatably to the sun gear 16. Inner teeth 23a are formed on the inner peripheral side of the ring gear 23 with which the smaller-diameter sides of the two planetary pinion gears 22 and 22 always engage. Ratchet teeth 23b are formed on the outer peripheral side. A planetary gear decelerating mechanism 24 is composed of the sun gear 16, the carrier 21, the planetary pinion gears 22 and 22 and the ring gear 23.

As shown in FIG. 8, there is furthermore provided a ring gear rotation controller 25 which controls to allow and prevent rotation of the ring gear 23. The ring gear rotation controller 25 comprises a lever stopper 26 rotatably provided, a solenoid 27 operating the lever stopper 26, and a spring 28 always imparting a force to the lever stopper 26.

The lever stopper 26 comprises a forked driving lever 29 rotatably provided, a rotatable follower lever 30 provided integrally with the driving lever 29 at a prescribed angle, a stopper claw 31 capable of being stopped by ratchet teeth 23b, relatively rotatably supported by the driving lever 29 and the follower lever 30 eccentrically with the rotation shafts thereof, bent into L-shape and having a disengaging section 31a formed at a leading end thereof, and a wire spring 32 which is attached around a rotation shaft of the lever stopper 26, and during non-excitation of the solenoid, holds the stopper claw 31 in a state integrated with the follower lever 30 by pressing the stopper claw 31 against the follower lever 30. The solenoid 27 has a plunger 33 retracted into the solenoid 27 upon excitation thereof, and the forked driving lever 29 engages with the leading end of the plunger 33. A spring 28 always impart a force so that the driving lever 29 can resist the retracting force of the plunger 33.

When the solenoid 27 is not in excitation, the driving lever 29 is biased by the spring 28 and rotates in a direction in which the plunger 33 is elongated. During excitation of the solenoid 27, the plunger is retracted, and as a result, the driving lever 29 rotates against the spring force of the spring 28.

Operation of the ring gear rotation controller 25 will now be described. In the normal non-excited state of the solenoid 27 shown in FIG. 8(a), the driving lever 29 rotates clockwise in FIG. 8(a) under the effect of the spring force of the spring 28, and the plunger 33 is held in a state of maximum elongation. At this point, the follower lever 30 and the stopper claw 31 are held in an integrated state by the spring force of the wire spring 32, and the stopper claw 31 does not engage with the ratchet teeth 23b of the ring gear 23.

Figure 8A:
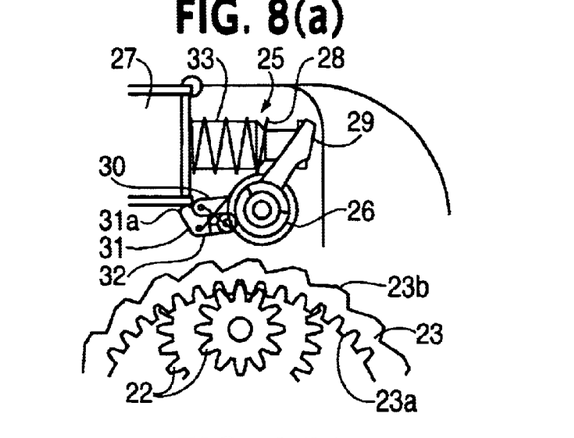
FIGS. 8(a) and 8(b) and 8(c) are descriptive views of operation of the ring gear rotation controller in the seat belt retracting apparatus in the example shown in FIG. 2.
Figure 8B:
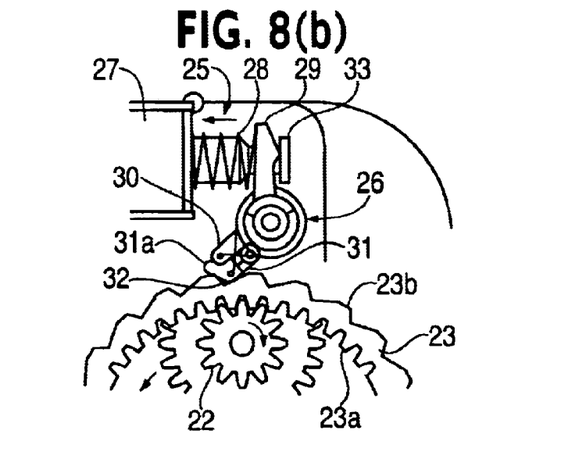

When the solenoid is excited in this state, the plunger 33 is retracted to the maximum as shown in FIG. 8(b), and the driving lever 29 rotates counter-clockwise in FIG. 8(b) against the spring force of the spring 28. The counter-clockwise rotation of the driving lever 29 causes counter-clockwise rotation of the follower lever 30. The stopper claw 31 is therefore pushed by the follower lever 30 and rotates similarly, counter-clockwise. The bent portion thereof engages with the ratchet teeth 23b under a prescribed pressing force. In this state of the stopper claw 31 engaging with the ratchet teeth 23b, rotation of the ring gear 23 in the webbing drawing direction is locked.

Figure 8C:
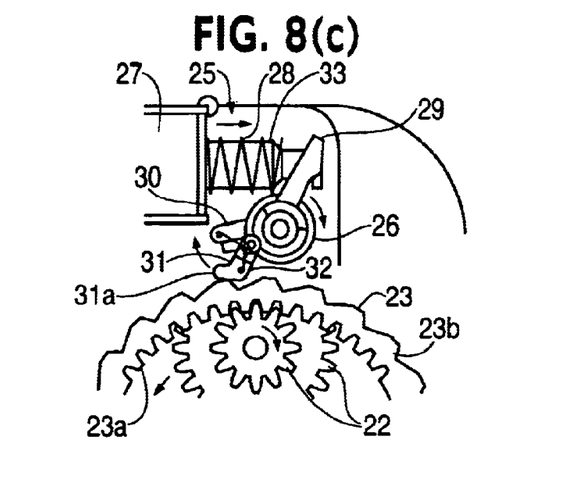

When the solenoid 27 is brought into the non-excited state from the locked state of the ring gear 23, the driving lever 29 rotates clockwise in FIG. 8(b) under the effect of the spring force of the spring 28, and the rotation of the driving lever 29 causes elongation of the plunger 33 as shown in FIG. 8(c), and clockwise rotation of the follower lever 30. However, because the bent portion of the stopper claw 31 engages with the ratchet teeth 23b under the prescribed pressing force, the clockwise rotation of the follower lever 30 does not cause the stopper claw 31 to follow the rotation of the follower lever 30, holding the engagement of the stopper claw 31 and the ratchet teeth 23b. At this point, the follower lever 30 rotates against the spring force of the wire spring 32.

When the driving lever 29 and the follower lever 30 further rotates clockwise, the supporting point of the stopper claw 31 also rotates in the same direction. The stopper claw 31 therefore rotates counter-clockwise in FIG. 8(c) around a contact portion between the disengaging section 31 a and the top of the ratchet teeth 23b, and as a result, engagement of the stopper claw 31 and the ratchet teeth 23b is released. When the plunger 33 is again in the maximum elongation state, the driving lever 29 and the follower lever 30 stop rotating, and the stopper claw 31 is pressed against the follower lever 30 under the effect of the spring force of the wire spring 32 into an integrated state. The ring gear rotation controller 25 is brought into the non-operating state as shown in FIG. 8(a).

Figure 9A:
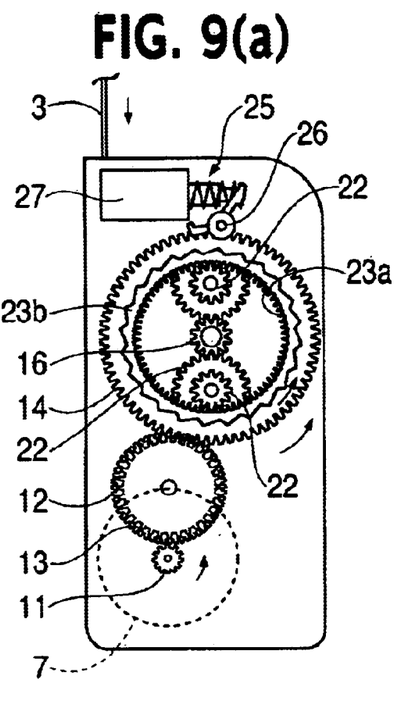
FIGS. 9(a) and 9(b) are descriptive views of operation of the deceleration mechanism in the seat belt retracting apparatus of the example shown in FIG. 2 with FIG. 9(a) showing the first power transmitting path and FIG. 9(b) showing the second power transmitting path.
Figure 9B:
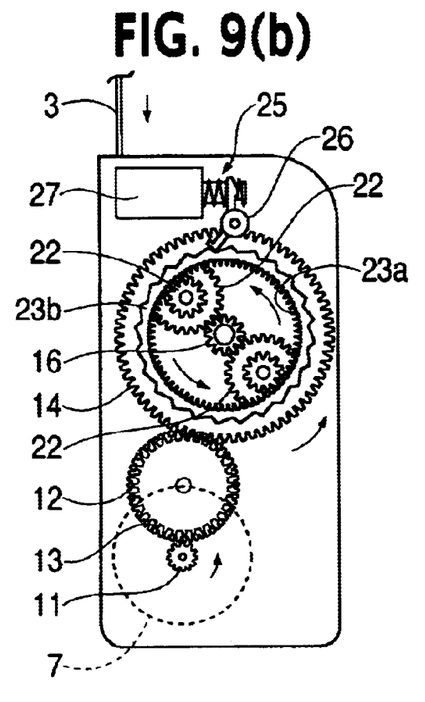

As shown in FIG. 9, as a result of operational control by the ring gear rotation controller 25, a first power transmitting path $DT_1$ for transmitting the driving force of the motor 7 to the reel at a small reduction ratio, and a second power transmitting path $DT_2$ are set in the deceleration mechanism 8. When possibility of a collision is predicted, the motor rotates in the webbing retracting direction in a state in which the second power transmitting path $DT_2$ is set to roll up the webbing 3 so as to give a second set belt tension $F_2$ larger than a first set belt tension $F_1$ in a comfort mode described later for ordinary running, thus forming a pretensioning motor (the first pretensioner of the invention) which increases the restraining force of the passenger as compared with that during ordinary running.

The motor gear 11, the first gear 12, the second gear 13, the third gear 14, the rotation coupling section 1Sa of the bush 15, the fourth gear 17, the sliding mechanism 20 and the ring gear rotation controller 25 are housed in a casing 34 of the deceleration mechanism 8.

Operation of the deceleration mechanism 8 having the configuration as described above will be described. First, when the solenoid 27 is not excited and the ring gear rotation controller 25 is not in operation, the stopper claw 31 does not engage with the ratchet teeth 23b and set at the position shown in FIG. 8(a). The ring gear 23 can therefore freely rotate, and the deceleration mechanism 8 is set at the first power transmitting path $DT_1$. When the motor 7 is rotation-driven in the retracting direction of the webbing at a low speed in this state, the third gear 14 rotates at a low speed in the retracting direction of the webbing 3 at a prescribed reduction ratio via the motor gear 11, the first gear 12 and the second gear 13. Since the rotation torque of the third gear 14 is smaller than the set resistance torque of the rotor shaft 18a of the rotary dumper 18 of the sliding mechanism 20 at this point, the sliding mechanism 20 does not operate, and the fourth gear 17 rotates integrally with the third gear 14 as described above. Rotation of the fourth gear 17 is transmitted to the reel 4 via the reel rotation shaft 6 spline engaging with the fourth gear, the power transmitting section 6c of the reel rotation shaft 6, and the socket section 21 a of the carrier 21. The reel 4 thus rotates in the retracting direction of the webbing 3, and the webbing 3 is retracted. Because the reduction ratio is small in this first power transmitting path $DT_1$, a small rotation torque in the webbing retracting direction is imparted to the reel 4, and the reel 4 retracts the webbing 3 with this small torque.

Upon rotation of the third gear 14, the sun gear 16 rotates integrally with the third gear 14. However, since the ring gear 23 can freely rotate in the first power transmitting path, the reel rotation shaft 6, the third gear 14, the sun gear 16, the fourth gear 17, the carrier 21, the ring gear 23, and the reel 4 do not rotate relative to each other, but rotate integrally in the retracting direction of the webbing.

On the other hand, when the solenoid 27 is excited and the ring gear rotation controller 25 operates, the stopper claw 31 is set at the position shown in FIG. 8(b) where the stopper claw 31 engages with the ratchet teeth 23b, rotation of the ring gear 23 in the draw out direction of the webbing is locked, and the deceleration mechanism 8 is set at the second power transmitting path $DT_2$. When the motor is rotation-driven in the retracting direction of the webbing 3 at a high speed in this state, the third gear 14 rotates at a high speed in the retracting direction of the webbing at a prescribed reduction ratio via the motor gear 11, the first gear 12 and the second gear 13. When the third gear 14 rotates, the sun gear 16 as well integrally rotates in the same direction. Then, rotation of the sun gear 16 causes the planetary pinion gears 22 and 22 to rotate in the webbing draw out direction, and rotation of the planetary pinion gears 22 and 22 imparts the force for rotation to the ring gear 23 in the webbing draw out direction. However, because the rotation of the ring gear 23 in the webbing draw out direction is locked, ring gear 23 does not rotate. As a result, the planetary pinion gears 22 and 22 revolve around the sun gear 16, and as a result, carrier 21 rotates at a largely decelerated speed in the retracting direction of the webbing 3. The largely decelerated rotation of the carrier 21 imparts a large rotation torque in the webbing retracting direction to the reel 4 via the socket section 21a, and the reel 4 retracts the webbing 3 with this large torque.

At the same time, the rotation torque of the third gear 14 is larger than the set resistance torque of the rotary shaft 18a. This causes the sliding mechanism 20 to operate, and there occurs sliding between the third gear 14 and the fourth gear 17. The fourth gear 17 rotates under brake relative to the third gear 14 while receiving the set resistance torque imparted to the rotor shaft 18a via the fifth gear 19. As a result, transmission of rotation torque from the third gear 14 to the fourth gear of the first power transmitting path is cut off. Therefore, direct connection of the first power transmitting path and the second power transmitting path is avoided upon setting the second power transmitting path:

As shown in FIGS. 2, 4, 5 and 10, the webbing draw out detecting mechanism 9 is arranged adjacent the fourth gear 17 in the casing 34, and comprises a fan-shaped switch plate 35, a revolving pin 36 supporting the switch plate 35 at the pivot of the fan, a contact-point arm 37 provided by extending from the pivot of fan of the switch plate 35 to a direction counter to the switch plate 35, and a limit switch 38 ON-OFF controlled by the contact-point arm 37.

A pair of guides 35b and 35c are arranged at a prescribed interval in the circumferential direction so to as to project in the radial direction to outside at both ends of an arcuate edge 35a of the fan of the switch plate 35, respectively. The switch plate 35 is provided so that a ring-shaped projection 17a of the fourth gear 17 is positioned between the pair of guides 35b and 35c and is in contact with the arcuate edge 35a. As a result, the revolving angle of the switch plate 35 is limited to a range of angles from a position where one of the guides 35b is in contact with the ring-shaped projection 17a to a position where the other guide 35c is in contact with the ring-shaped projection 17a.

Furthermore, an arcuate hole 35d is pierced along the arcuate edge 35a on the switch plate 35. When the arcuate edge 35a comes into contact with the ring-shaped projection 17a, and pressing force is imparted to a portion 35e between the arcuate hole 35d and the arcuate edge 35a, and this portion 35a is slightly deflected. Along with rotation of the ring-shaped projection 17a, therefore, the switch plate 35 can revolve without sliding.

Figure 10:
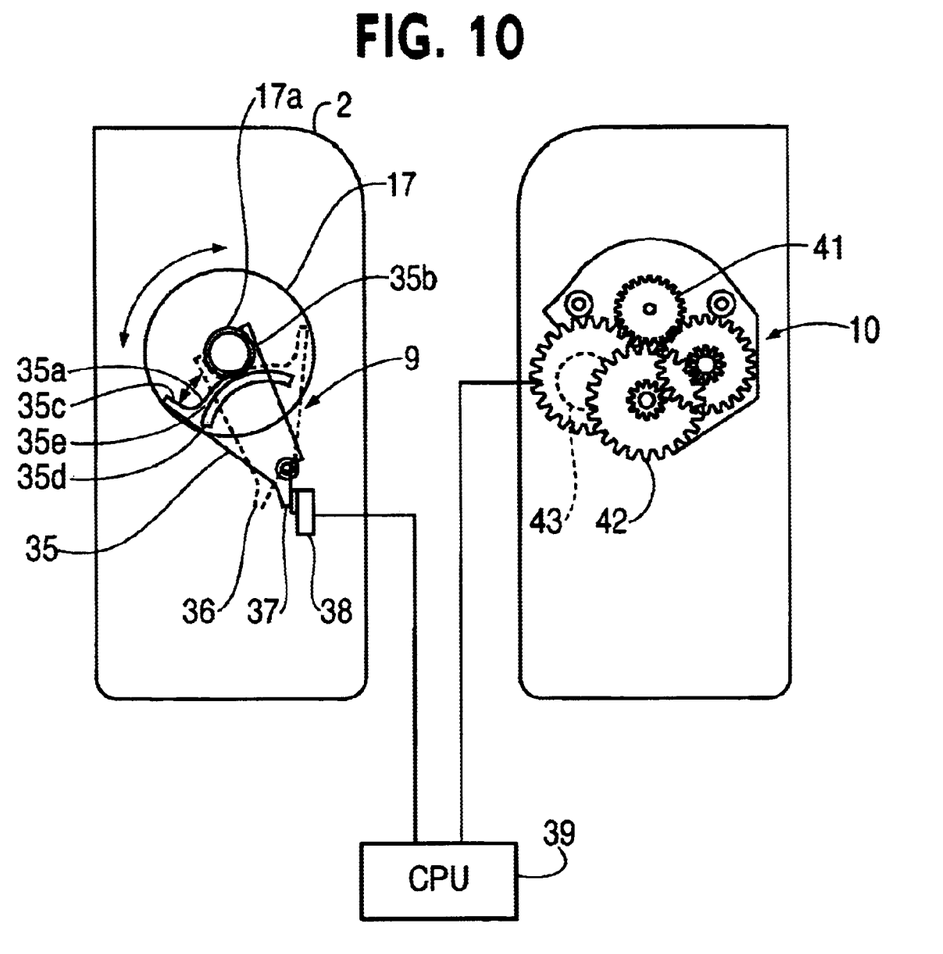
FIG. 10 is a descriptive view of operation of the webbing draw out detecting means and the reel rotation detecting means in the seat belt retracting apparatus in the example shown in FIG. 2.

In the webbing drawing detecting mechanism 9 having the configuration as described above, the switch plate 35 revolves along with rotation of the reel 4 in the webbing draw out direction, from the non-operating position shown by a dotted line in FIG. 10 around the revolving pin 36 in the webbing retracting direction. Then, the contact-point arm 37 as well rotates in the same direction and comes into contact with the limit switch 38, and the limit switch 38 is turned on. Turn-on of the limit switch 38 causes draw out of the webbing 3 to be detected by the webbing draw out detecting mechanism 9. As a result of detection of the moment when the webbing 3 is drawn out by the webbing draw out detecting mechanism 9, a power supply 40 (shown in FIG. 11) of a central processing unit (CPU) 39 (shown in FIG. 11) controlling the motor 7 is turned on.

As shown in FIGS. 2, 4, 5 and 10, the reel rotation detecting means 10 is arranged outside the locking mechanism 5, and comprises a rotation takeout gear 41 attached to an end 6d having a reduced diameter on the opposite side of the spline groove 6b of the reel rotation shaft 6, a gear train 42 which decelerates rotation of the reel 4 obtained from the rotation takeout gear 41, and a rotation angle detector 43 which detects the decelerated rotation, angle to be transmitted as an amount of change in electric resistance of the variable resistance.

In the reel rotation detecting mechanism 10 having the configuration as described above, upon rotation of the reel 4, the rotation thereof is decelerated and transmitted to the rotation angle detector 43, and a change in electric resistance value of the variable resistance causes a change in voltage impressed on the variable resistance. By detecting the amount of change in voltage, the rotating status of the reel 4, i.e., rotation and stoppage of the reel 4, and the rotating direction of the reel 4 (the draw out direction and the retracting direction of the webbing 3) are detected.

In the seat belt retracting apparatus 1 of this embodiment, driving of the motor 7 upon drawing out the webbing 3 by the passenger is controlled through the webbing draw out detecting mechanism 9 and the reel rotation detecting mechanism 10. More specifically, when the passenger grips the webbing 3 to prevent retraction thereof, or pulls out the webbing 3 on the contrary during retraction of the webbing 3 by ordinary driving of the motor 7, the switch plate 35 revolves slightly in the webbing retracting direction, thus turning on the limit switch 38, thereby detecting draw out of the webbing 3, and/or a change in voltage is detected by means of the rotation angle detector 43 to detect draw out of the webbing 3 and as a result, driving of the motor 7 is discontinued. This makes it possible for the passenger to draw out the webbing 3 with a slight force. When draw out of the webbing by the passenger is completed, and the webbing 3 stops, at least one of the webbing draw out detecting mechanism 9 and the reel rotation detecting mechanism 10 detects the end of webbing draw out, and the motor 7 is driven again, whereby retraction of the webbing 3 is resumed.

Figure 11:
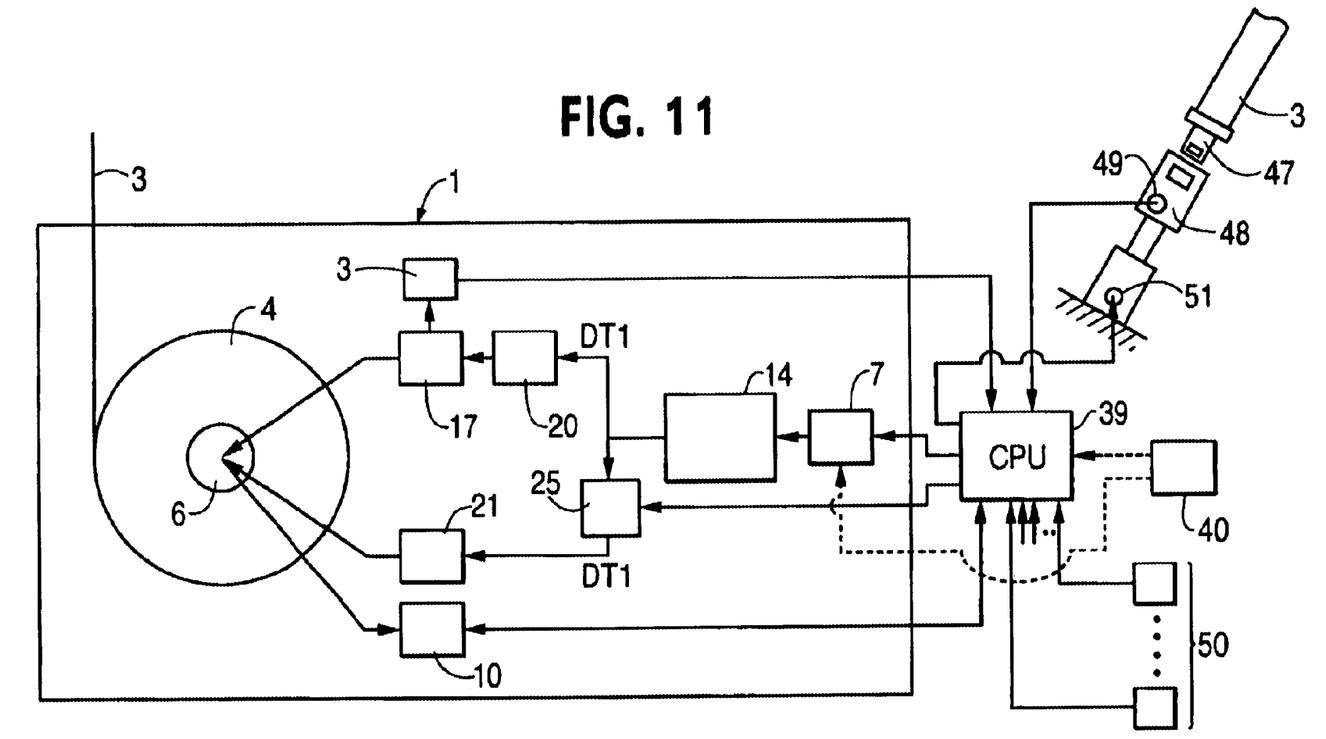
FIG. 11 is a descriptive view of operational control of the deceleration mechanism by the CPU in the seat belt retracting apparatus in the example shown in FIG. 2.

In this embodiment, various modes can be set in advance, including a comfort mode in a relatively small first set belt tension $F_1$ state in which the webbing 3 is fit to the passenger to an extent not making the passenger feel sensation of, oppression during usual driving; a warning mode in a state of a second set belt tension $F_2$ larger than the first set belt tension $F_1$ in which the body of the passenger is restrained more tightly than in the comfort mode by retracting the webbing 3 by a prescribed amount from that in the comfort mode, because of a high emergency such as when possibility of a collision with an obstacle such as another car is predicted; a hold mode in a state of a third set belt tension $F_3$ larger than the second set belt tension $F_2$, in which, when a collision is determined by detecting a rapid deceleration over a set degree of deceleration, the buckle 48 is strongly pulled by a buckle pretensioner 51 to restrain and hold the body of the passenger very strongly as compared with the warning mode; and a child seat securing mode in which the child seat is secured to the car seat by retracting a prescribed amount of the webbing 3. In response to any of these various modes, the CPU 39 driving-controls, as shown in FIG. 11, the motor 7, the solenoid 27 of the ring gear rotation controller 25 and the buckle pretensioner 51, on the basis of detection signals from the webbing draw out detecting mechanism 9, the reel rotation detecting mechanism 10, a buckle switch 49 which detects insertion-engagement of a tongue 47 into the buckle 48, a car interval detecting sensor detecting the distance to the car in front or behind, a collision sensor, and a prescribed number of exterior signal sensors 50 detecting various conditions of the car.

The belt tension control upon determination of possibility of a collision with an obstacle or determination of a collision in the passenger restraining protective system A of this embodiment will now be described. This belt tension control is carried out by the CPU 39 in accordance with the flow shown in FIG. 12. In the following description, determination of a collision includes not only a case where a collision actually occurs, but also a case where, prior to occurrence of a collision, the collision is unavoidable and can certainly occur. The following legends appear for FIG. 12:

S1: Calculate vehicle body acceleration

S2: Determine collision

S3: Calculate relative distance, relative speed and vehicle speed

S4: Determine possibility of collision

Figure 12:
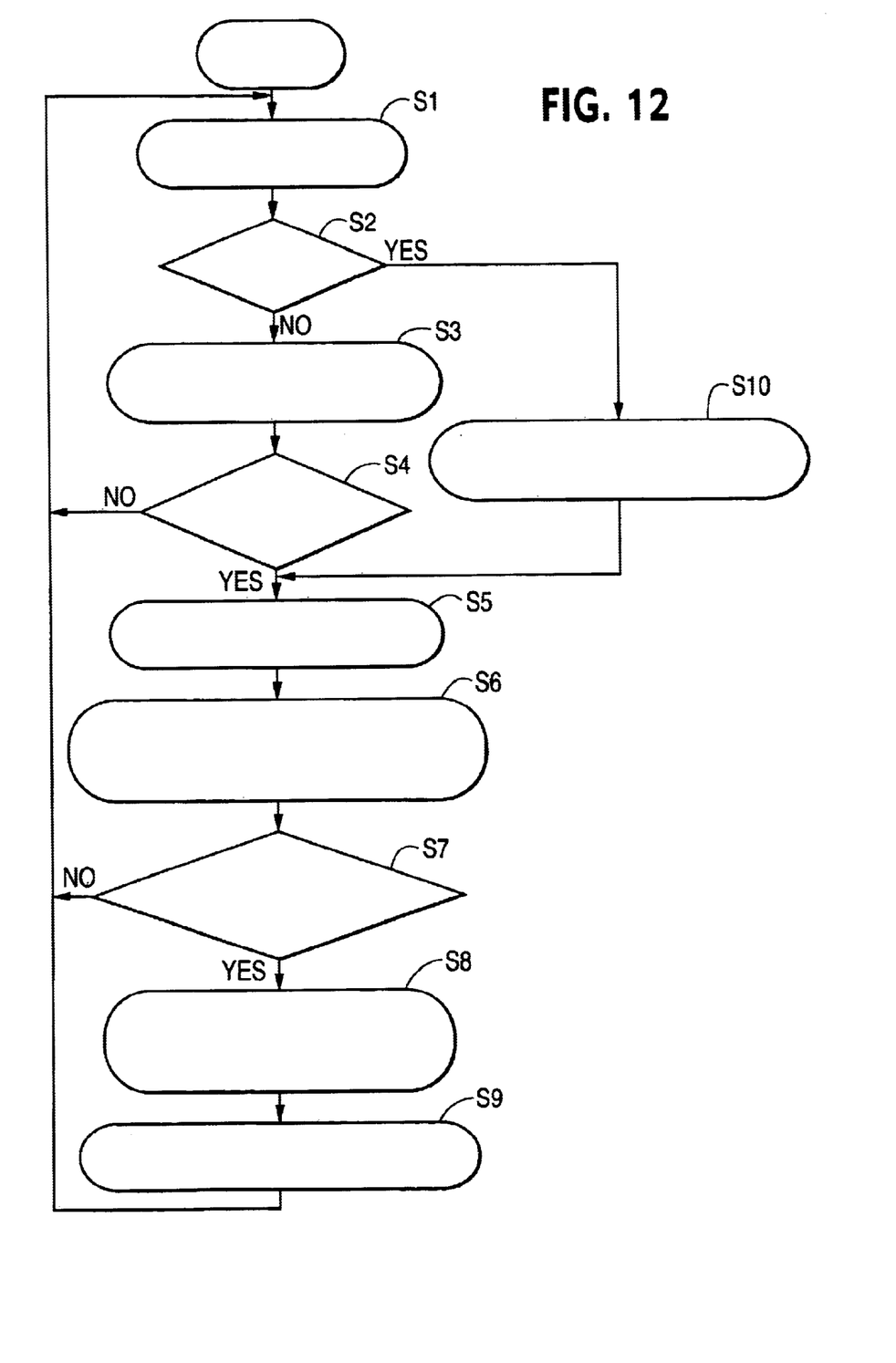
FIG. 12 is a flowchart for belt tension control upon determination of possibility of collision and occurrence of a collision with an obstacle in the passenger retraining protective system shown in FIG. 1.

S5: Switch over deceleration mechanism (large)

S6: Rotate pretensioning motor in rollup direction; set second setting belt tension $F_2$; and then, stop and hold motor S7: Determine resolution of possibility of collision S8: Switch over deceleration mechanism to cause pretensioning motor to rotate in drawing direction S9: Set first setting belt tension $F_1$, and then stop and hold motor S10: Operate buckle pretensioner, and then set third setting belt tension $F_3$ In FIG. 12, first in step S1, the deceleration of the car is detected, and a collision with an obstacle such as another car is determined on the basis of the detected deceleration of the car in step S2. That is, occurrence or not of a collision is determined from whether or not the resultant deceleration of the car exceeds a set deceleration. When determination made that the deceleration of the car does not exceed the set deceleration and the collision has not as yet occurred, the relative distance to the obstacle, the relative speed with the obstacle, and vehicle speed of the car are calculated in step S3. Then, in step S4, possibility or not of a collision with the obstacle is determined on the basis of the resultant values. If possibility of collision is determined to be non-existent, the process goes back to step S1, and step S1 and the subsequent steps are conducted.

When possibility of a collision is determined to exist in step S4, the solenoid 27 of the ring gear rotation controller 25 is excited by the CPU 39 in step S5, and the deceleration mechanism 8 is switched over to the second power transmitting path $DT_2$. Then, in step S6, the motor 7 is rotated as a pretensioning motor in the webbing retracting direction; the reel 4 retracts the webbing 3 until the second set belt tension $F_2$ is reached; and then, the motor 7 is stopped and held. As a result, the passenger is restrained with a prescribed restraining force. Then, in step S7, it is determined whether or not the possibility of collision has been resolved.

If the possibility of collision is not determined to have been resolved, the process returns back to step S1, and then, step S1 and the subsequent steps are executed. In step S8, if the possibility of collision is determined to have been resolved, the motor 7 is rotated in the reverse direction which is the webbing draw out direction, and during counter rotation of the motor 7, the deceleration mechanism 8 is switched over to the first power transmitting path $DT_1$ of a smaller transmission torque. Then, in step S9, the webbing 3 is pulled out as a result of counter rotation of the motor 7, leading to a smaller belt tension. When this belt tension becomes the first set belt tension $F_1$ in the comfort mode for usual running, the motor 7 stops and is held in this state. As a result, the webbing 3 is fitted to an extent not making the passenger have a feeling of oppression. Subsequently, the process returns back to step S1, and step S1 and the subsequent steps are executed.

When a collision is determined to have occurred in step S2 with a deceleration of the car exceeding a set deceleration, the buckle pretensioner 51 serving as the second pretensioner is operated in step S10. The buckle 48 is very strongly pulled; the webbing 3 is set, to the third belt tension $F_3$ and the passenger is restrained with a large restraining force. Then, the process goes to step S5, and step S5 and the subsequent steps are executed.

According to the passenger restraining protective system A of this embodiment, as described above, when a large deceleration of the car results from a collision or the like, it is possible to preferentially operate the buckle pretensioner, irrespective of the operation of the motor 7 as a pretensioning motor. It is therefore possible to certainly restrain the passenger with a large restraining, force even in the case of a collision which cannot be detected by a sensor predicting a collision as described above.

Even after operation of the second pretensioner in step S10, execution of step S5 and the subsequent steps makes it possible to continue operation of the motor 7 as a pretensioning motor until the motor 7 and the CPU 39 are cut off from the vehicle power supply 40 so long as the possibility of collision is not resolved.

Because the motor 7 of the seat belt retracting apparatus 1 is used as the first pretensioner operating upon determination of possibility of a collision, and the buckle pretensioner is used as the second pretensioner which operates upon determination of a collision and requires a relatively small installation space, the installation space on the buckle 48 side for the second pretensioner suffices to be relatively small.

During operation of the first pretensioner, the necessity to operate the clamp mechanism of the second pretensioner is eliminated, thus facilitating operational control of the first and second pretensioners. In addition, since the first pretensioner is provided on the seat belt retracting apparatus 1 side, draw out of the webbing 3 wound in the seat belt retracting apparatus 1 is locked upon operation of the first pretensioner, the necessity of a mechanism for locking draw out of the webbing 3 retracted into the seat belt retracting apparatus 1 can be eliminated, when operating the first pretensioner as in the vehicle shoulder belt apparatus disclosed in the aforementioned Unexamined Patent Publication.

Furthermore, the seat belt retracting apparatus 1 is operable even after operation of the first and second pretensioners upon occurrence of a slight collision as described above, when driving the car after a slight collision, therefore, it is possible to ensure removal of a slack of the webbing 3, thus permitting restraining of the passenger.

In the aforementioned embodiment, the seat belt retracting apparatus 1 retracting the webbing 3 only by means of the driving force of the motor 7. The present invention is not however limited to this, but ordinary retraction of the webbing may be carried out with a spring, and in an emergency, the webbing may be retracted by using a seat belt retracting apparatus 1 retracting the webbing with a motor. In summary, any seat belt retracting apparatus may be applied in the invention so far as it is a seat belt retracting apparatus in which, when a collision is predicted, the belt tension is set at the second set belt tension $F_2$ by retracting the webbing 3 by the first pretensioner; and when a collision is determined, the tension of the second pretensioner at the third set belt tension $F_3$ larger than the second set belt tension $F_2$.

According to the passenger restraining protective system of the present invention, as is clear from the above description, when a collision is determined in the determination of collision, the second pretensioner is preferentially operated irrespective of the operation of the first pretensioner. It is therefore possible to certainly set the tension of the webbing at the second set tension larger than the first set tension for the operation of the first pretensioner. As a result, even in the case of a collision which cannot be detected by a conventional sensor predicting a collision, it is possible to certainly restrain the passenger with a large restraining force. Particularly, because the first pretensioner is provided in the seat belt retracting apparatus, the necessity of operational control of the second pretensioner upon operation of the first pretensioner can be eliminated, and it is not necessary to lock draw out of the webbing retracted in the seat belt retracting apparatus. Further, because the first pretensioner requiring a relatively large installation space is installed in the seat belt retracting apparatus and the second pretensioner requiring only a relatively small installation space is provided on the buckle side, the installation space for a pretensioner installed on the buckle side can be relatively reduced. It is therefore easier to install the pretensioner on the buckle side providing only a small space. Additionally, because operation of the first pretensioner is continued even after operation of the second pretensioner until the possibility of collision is resolved, it is possible to certainly remove slack of the webbing when driving the vehicle again after a slight collision as described above.

While particular embodiments according to the invention have been illustrated and described above, it will be clear that the invention can take a variety of forms and embodiments within the scope of the appended claims.

I claim:

1. A passenger restraining protective system having a seat belt retracting apparatus for retracting a seat belt in order to restrain a passenger of a vehicle, comprising:

a first pretensioner having a motor adapted to operate when the possibility of a collision is determined to exist, to thereby retract the seat belt until the tension of the seat belt reaches a first belt tension that is higher than the belt tension that exists during normal driving conditions, the motor including a deceleration mechanism for converting rapid rotation of the motor into torque for producing the first belt tension;

a second pretensioner adapted to operate when a collision is determined to have occurred, to thereby retract the seat belt until the tension of the seat belt reaches a second belt tension that is higher than said first belt tension;

a controller which, when a collision is determined to have occurred, is adapted to cause said second pretensioner to operate, irrespective of the operation of said first pretensioner.

2. The passenger restraining protective system of claim 1, wherein said first pretensioner comprises a seat belt retractor having a spool.

3. The passenger restraining protective system of claim 2, wherein said second pretensioner comprises a buckle type pretensioner.

4. The passenger restraining protective system of claim 1, wherein, the controller is adapted to cause the first pretensioner to continue to operate even after discontinuance of operation of said second pretensioner until the possibility of a collision no longer exists.

5. The passenger restraining protective system of claim 1, wherein the controller is configured to determine the possibility of a collision occurring based on the relative distance between the vehicle and an obstacle.

6. The passenger restraining system of claim 1, wherein the deceleration mechanism includes a plurality of gears for transferring the rapid rotation of the motor into a torque for producing the first belt tension.

7. The passenger restraining system of claim 6, wherein the gears include a ring gear and a plurality of planetary gears engaged with an inner surface of the ring gear and operatively connected to a spool for holding the seat belt.

8. The passenger restraining system of claim 7, further comprising a locking mechanism for preventing rotation of the ring gear.

9. The passenger restraining system of claim 8, wherein the locking mechanism is configured to operate to prevent the ring gear from rotating when a collision is determined to have occurred.

10. The passenger restraining system of claim 1, wherein the deceleration mechanism includes a plurality of gears for transferring the rotation of the motor to a spool for winding up the seat belt.

11. The passenger restraining system of claim 10, wherein the gears include a lockable ring gear and at least one planetary gear operatively connected to the spool.

* * * * *